(12) United States Patent
Horita et al.

(10) Patent No.: US 7,724,380 B2
(45) Date of Patent: May 25, 2010

(54) METHOD AND SYSTEM FOR THREE-DIMENSIONAL MEASUREMENT

(75) Inventors: Shinichi Horita, Osaka (JP); Yoshihisa Abe, Sakai (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 0 days.

(21) Appl. No.: 11/434,310

(22) Filed: May 15, 2006

(65) Prior Publication Data

US 2006/0269123 A1    Nov. 30, 2006

(30) Foreign Application Priority Data

May 30, 2005    (JP) .............................. 2005-156564

(51) Int. Cl.
*G06K 5/00* (2006.01)
(52) U.S. Cl. ...................... 356/614; 356/601; 235/437; 700/184
(58) Field of Classification Search ................. 356/625, 356/604
See application file for complete search history.

(56) References Cited

U.S. PATENT DOCUMENTS

| | | | | | |
|---|---|---|---|---|---|
| 5,311,784 | A | * | 5/1994 | Girard et al. ................ | 73/865.8 |
| 5,465,221 | A | * | 11/1995 | Merat et al. ................... | 702/83 |
| 5,471,541 | A | * | 11/1995 | Burtnyk et al. .............. | 382/153 |
| 6,400,998 | B1 | * | 6/2002 | Yamazaki et al. ............ | 700/86 |
| 6,438,445 | B1 | * | 8/2002 | Yoshida et al. .............. | 700/173 |
| 6,597,967 | B2 | * | 7/2003 | Xi et al. ........................ | 700/184 |
| 7,111,783 | B2 | * | 9/2006 | Xi et al. ........................ | 235/437 |

FOREIGN PATENT DOCUMENTS

| | | |
|---|---|---|
| JP | 61-116608 | 6/1986 |
| JP | 02-038913 | 2/1990 |
| JP | 2002-031511 | 1/2002 |

* cited by examiner

*Primary Examiner*—Gregory J Toatley, Jr.
*Assistant Examiner*—Rebecca C Slomski
(74) *Attorney, Agent, or Firm*—Sidley Austin LLP

(57) ABSTRACT

A three-dimensional measurement method is provided for measuring an object shape in a non-contact manner by using a non-contact sensor and a sensor moving mechanism that changes a position and a posture of the sensor and can operate by numerical control, moving the non-contact sensor in accordance with measurement path information indicating plural positions and postures of the sensor at the respective positions. The measurement path information is set in advance by teaching. The method includes performing preliminary three-dimensional measurement of the object in accordance with preliminary measurement path information, using shape data obtained by the preliminary three-dimensional measurement and shape data of an imaginary object as a measurement target in the teaching to detect positioning error between the object and the imaginary object, modifying the measurement path information depending on the detected positioning error, and performing three-dimensional measurement of the object in accordance with the modified measurement path information.

9 Claims, 5 Drawing Sheets

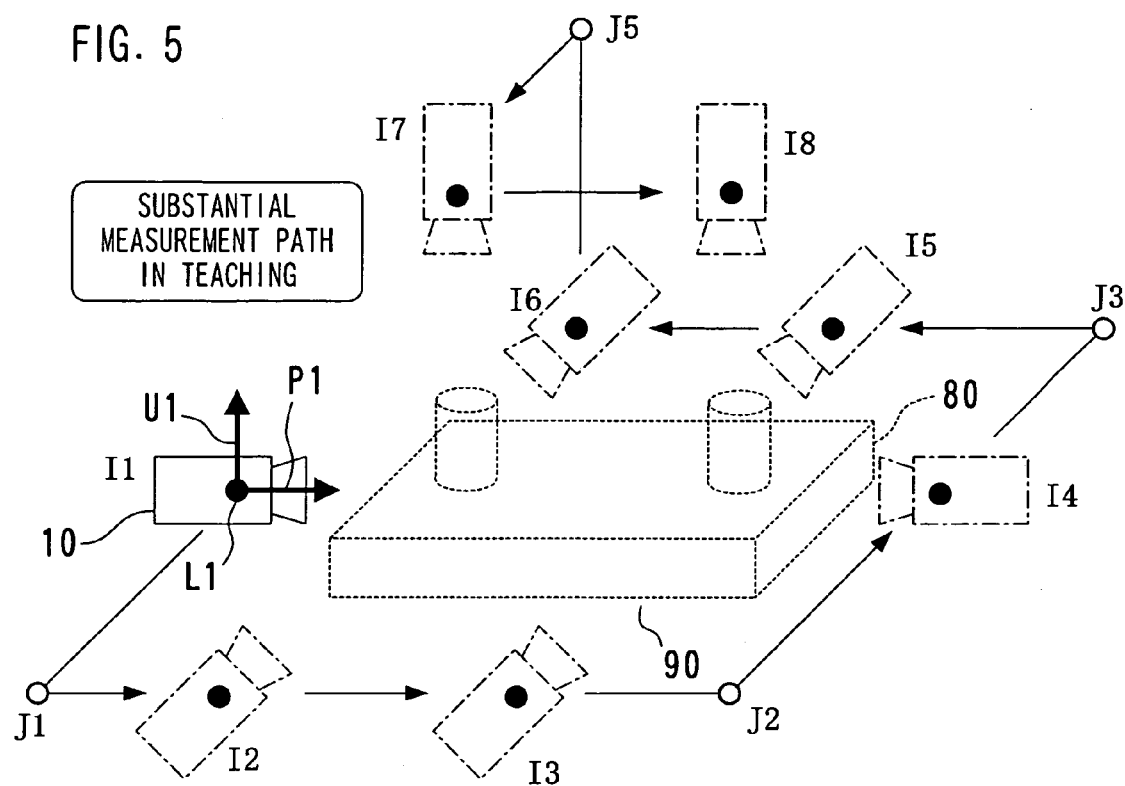
FIG. 5 SUBSTANTIAL MEASUREMENT PATH IN TEACHING
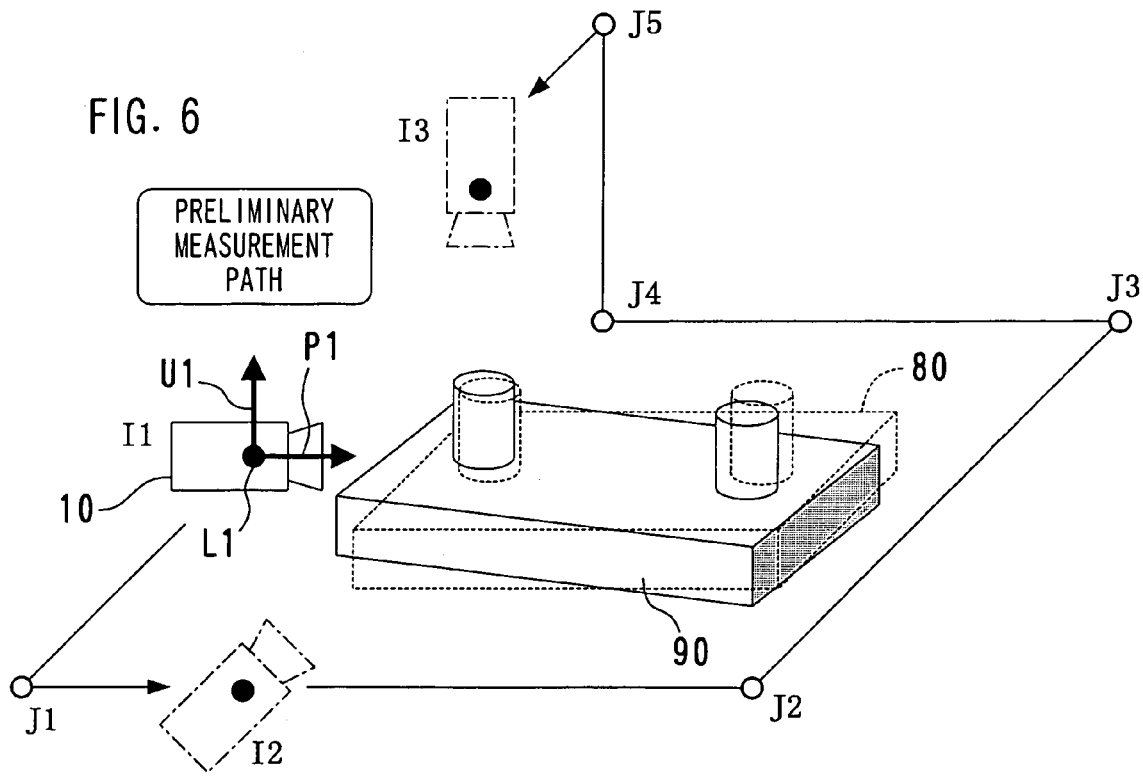
FIG. 6 PRELIMINARY MEASUREMENT PATH

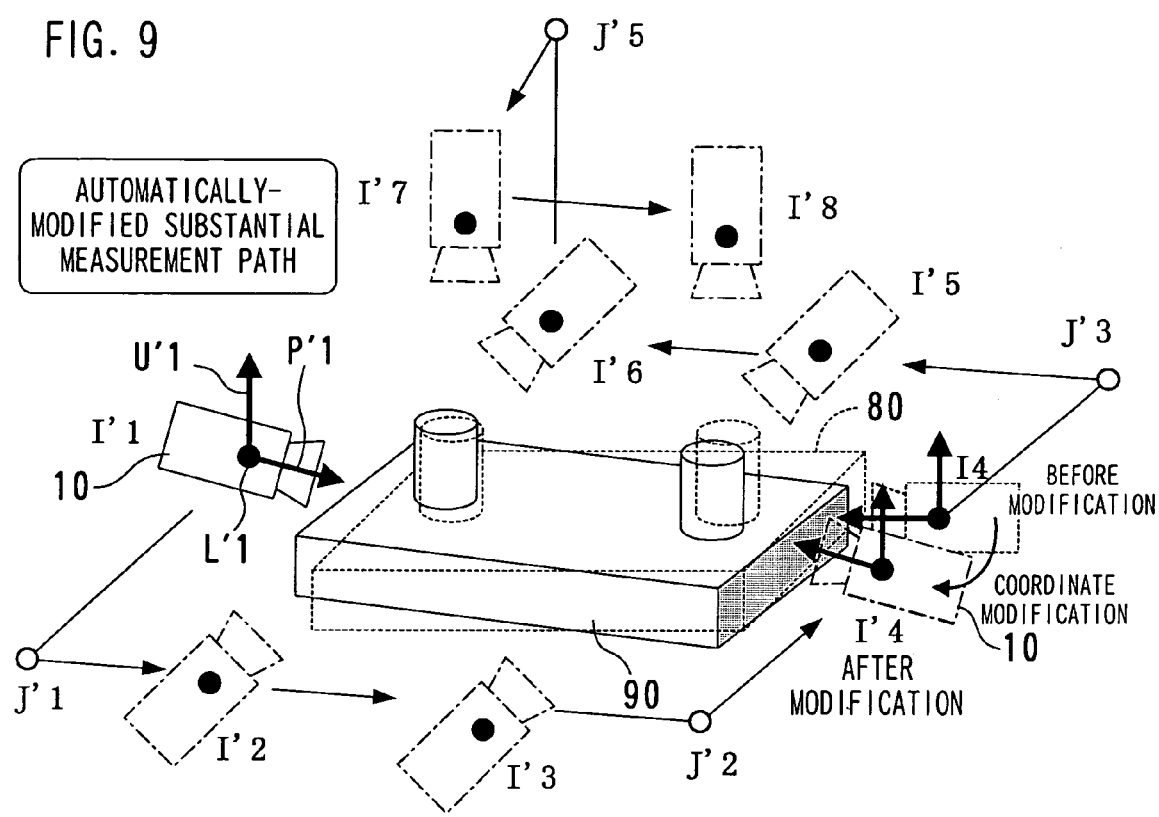

METHOD AND SYSTEM FOR THREE-DIMENSIONAL MEASUREMENT

This application is based on Japanese Patent Application No. 2005-156564 filed on May 30, 2005, the contents of which are hereby incorporated by reference.

BACKGROUND OF THE INVENTION

1. Field of the Invention

The present invention relates to a three-dimensional measurement method for measuring a shape of an object in a non-contact manner and a three-dimensional measurement system using the method.

2. Description of the Related Art

As non-contact three-dimensional measurement means, an optical three-dimensional digitizer is known that uses a triangulation method such as a stereo vision method or a light-section method. Such a three-dimensional digitizer can digitize a shape of an object placed within the field of view by one-time measurement. For example, Japanese unexamined patent publication No. 2002-31511 describes measuring an object using a three-dimensional digitizer. On this occasion, the position of the three-dimensional digitizer is changed such that the object is viewed from the front, back, left or right side. In this way, shape data of the entire periphery of the object is obtained. Further, Japanese examined patent publication No. 6-8730 describes a method for measuring a reference point of a work using an optical distance sensor attached to a tip of a robot arm to correct fixing error of the work.

In contrast, with respect to contact three-dimensional measurement, measurement is automated in which a numerical controller is used to move a probe (sensing pin) automatically along an object surface. Japanese patent No. 2741518 describes a related art concerning the automation. More specifically, before substantial measurement in which a probe is automatically moved, preliminary measurement is performed in which the probe is moved by a manual operation in order to detect positioning error of an object to be arranged at a predetermined position. Then, depending on the detection result of the positioning error, a moving start point of the probe in the substantial measurement is modified.

As for contact measurement devices, even if an arrangement position of an object is significantly deviated from a correct position, it is desirable that preliminary measurement should be performed manually to prevent a probe from failing to contact the object or from pressing against the object excessively.

As for non-contact three-dimensional measurement, it is likely that a movement mechanism capable of operating by numerical control is used to automatically change a position and a posture of a three-dimensional digitizer. The automation enables rapid and efficient measurement without omission.

In the case where an approximate shape of an object is known, for example, when the object is a product designed by CAD (Computer Aided Design), or, when the object is a replication of a sample or a primary standard, it is desirable that teaching should be conducted as is the case with industrial robots. A measurement path most suitable for a shape of an object is set by off-line teaching based on an imaginary object shown by CAD data or by direct teaching based on an actual object such as a sample or a primary standard. In this way, measurement accuracy is enhanced.

A problem arises, however, that an object needs arranging to take a posture determined to be a set position in the teaching in order to realize desired accuracy.

SUMMARY OF THE INVENTION

The present invention is directed to solve the problems pointed out above, and therefore, an object of the present invention is to provide an automatic measurement system for realizing optimum measurement assumed by teaching even if an object is not in place in non-contact measurement.

According to one aspect of the present invention, a three-dimensional measurement method and a three-dimensional measurement system for measuring a shape of an object in a non-contact manner are provided. The method and the system respectively includes using a non-contact sensor for three-dimensional measurement and a sensor moving mechanism that changes a position and a posture of the non-contact sensor and can operate by numerical control, moving the non-contact sensor in accordance with measurement path information indicating plural positions and postures of the sensor at the respective positions, the measurement path information being set in advance by teaching, performing preliminary three-dimensional measurement of the object in accordance with preliminary measurement path information, using shape data obtained by the preliminary three-dimensional measurement and shape data of an imaginary object as a measurement target in the teaching to detect positioning error between the object and the imaginary object, modifying the measurement path information depending on the detected positioning error, and performing three-dimensional measurement of the object in accordance with the modified measurement path information.

More preferably, when a portion is set for the object, the portion being to be a reference of a coordinate system applied to the shape data of the object, the preliminary measurement path information indicates a position and a posture of the sensor necessary for measuring at least the portion.

Further, according to another aspect of the present invention, the measurement method and the measurement system respectively includes memorizing occupied space information indicating spaces occupied by the non-contact sensor and the sensor moving mechanism and movement space information indicating a space where the sensor moving mechanism is movable, before the three-dimensional measurement of the object, determining, based on the occupied space information and the movement space information, whether or not measurement in accordance with the modified measurement path information is possible, when a result of the determination shows that the measurement is impossible, remodifying the modified measurement path information so that the measurement is possible, and performing the three-dimensional measurement of the object in accordance with the remodified measurement path information.

According to three-dimensional measurement to which the present invention is applied, measurement path information for defining numerical control of a sensor moving mechanism is modified in accordance with a result of preliminary three-dimensional measurement. Accordingly, it is unnecessary to arrange an object at a predetermined position precisely.

With respect to an object in which a portion to be a reference of a coordinate system is set, preliminary measurement path information is set in a manner to measure at least the portion. Thereby, positioning error of the object can be detected with high degree of accuracy, because a simple shape portion is usually designated as the portion to be a reference.

In a configuration where occupied space information and movement space information are stored, modification of a measurement path based on a result of preliminary three-dimensional measurement is not limited to parallel translation of a measurement path set by teaching, rotational translation thereof and a combination thereof. Stated differently, modification is possible that includes, for example, the change from linear translation to curve translation in a manner to avoid exceeding the movement limit of the sensor moving mechanism and avoid interference between a non-contact sensor and an object. In this regard, however, a positional relationship between the non-contact sensor and the object in a changed portion in a modified measurement path is different from that in teaching. Accordingly, it is desirable to perform an alarm operation by beeping, displaying a message, adding alarm information to measurement data (measurement result) or some other means to notify a user of the changed positional relationship.

The present invention enables provision of an automatic measurement system for conducting optimum measurement assumed by teaching even if an object is not in place in non-contact measurement.

These and other characteristics and objects of the present invention will become more apparent by the following descriptions of preferred embodiments with reference to drawings.

BRIEF DESCRIPTION OF THE DRAWINGS

FIG. 5 is a diagram showing a substantial measurement path in off-line teaching.

FIG. 6 is a diagram showing an example of a preliminary measurement path.

FIG. 9 is a diagram showing a substantial measurement path that is automatically modified.

DESCRIPTION OF THE PREFERRED EMBODIMENTS

Figure 1:
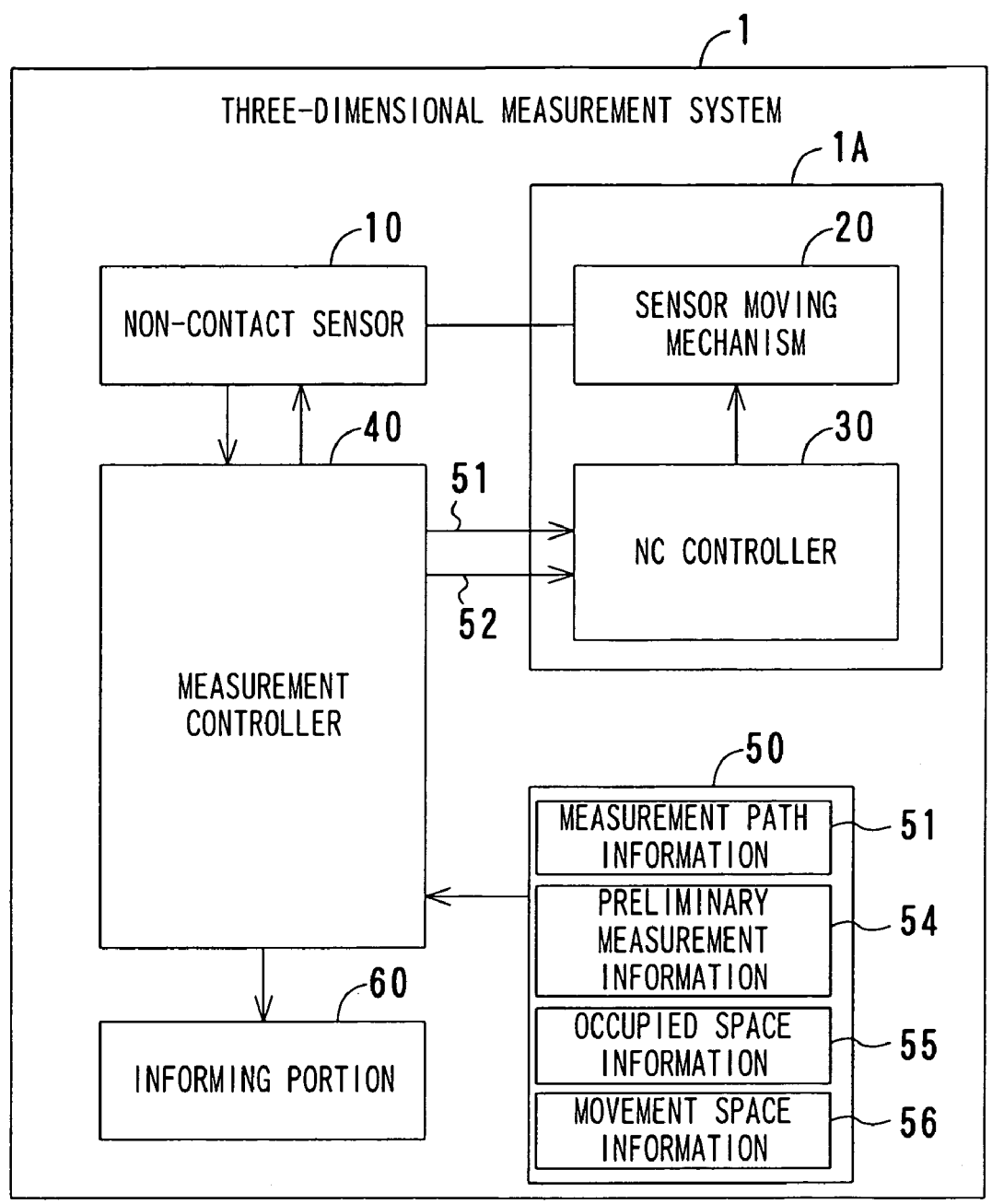
FIG. 1 is a block diagram showing a configuration of an automatic measurement system according to the present invention.

FIG. 1 is a block diagram showing a configuration of an automatic measurement system according to the present invention.

The automatic measurement system 1 includes a non-contact sensor 10 for three-dimensional measurement, a sensor moving mechanism 20 that changes a position and a posture of the non-contact sensor 10 and can operate by numerical control, an NC controller 30 for performing numerical control of the sensor moving mechanism 20, a measurement controller 40 that serves to control the non-contact sensor 10 and to perform processes for sensor output, a nonvolatile memory 50 for storing various types of data, an informing portion 60 for notifying a user of measurement situations and a control panel (not shown).

A known optical three-dimensional digitizer (area sensor) is suitable as the non-contact sensor 10. The measurement principle may be a stereo vision method, a light-section method or any other method. The digitizer of this type is faced toward an object to be measured for operation, similarly to the case where a camera is pointed at an object, thereby to obtain shape data of the object to be measured within a field of view of the digitizer. While the number of points from which position information is obtained one time operation depends on imaging resolution, position information on hundreds of thousands through one million of points can be obtained by one time operation taking approximately a few seconds.

The sensor moving mechanism 20 and the NC controller 30 constitute a sensor driving device 1A that performs preset operations. An industrial robot used for machining or measurement can be used as the sensor driving device 1A. The sensor moving mechanism 20 has a movable portion that supports the non-contact sensor 10 and can change a three-dimensional position and a posture thereof. The mechanism may be an arm mechanism, a sliding mechanism or others.

The measurement controller 40 includes a processor for executing predetermined programs and achieves automatic three-dimensional measurement in corporation with the NC controller 30. The three-dimensional measurement includes substantial measurement and preliminary measurement. In the substantial measurement, the non-contact sensor 10 travels to plural positions around an object in turn, thereby to obtain shape data of plural portions of the object. The transfer path of the non-contact sensor 10 is set in advance by teaching. The preliminary measurement is conducted in order to detect a difference between an imaginary position of an object in the teaching and an arrangement position of an actual object. The measurement controller 40 is provided with a data processing portion that modifies a measurement path (a travel procedure of the non-contact senor 10) in the substantial measurement in accordance with the result of the preliminary measurement.

The memory 50 stores measurement path information 51, preliminary measurement information 54, occupied space information 55 and movement space information 56. The measurement path information 51 indicates plural positions pertaining to the substantial measurement and postures of the sensor at the respective positions, both of which are set by teaching. The preliminary measurement information 54 is information for defining a procedure of the preliminary measurement. The preliminary measurement information 54 shows a method for automatically determining, based on the measurement path information 51, preliminary measurement path information 52 indicating plural positions pertaining to the preliminary measurement and postures of the sensor at the respective positions. The occupied space information 55 shows spaces occupied by the non-contact sensor 10 and the sensor moving mechanism 20. The movement space information 56 shows a space where the sensor moving mechanism 20 can move.

The informing portion 60 performs either or both audio output and message display in accordance with instructions from the measurement controller 40. More specifically, the informing portion 60 includes a buzzer, a display and the combination thereof.

The automatic measurement system 1 with the configuration mentioned above is used for, for example, three-dimensional measurement of products in which CAD data are compared with products manufactured based on the CAD data. Both the off-line teaching and the direct teaching are possible for this use. However, the off-line teaching is more suitable because it is practical at stages before manufacturing products.

Figure 2:
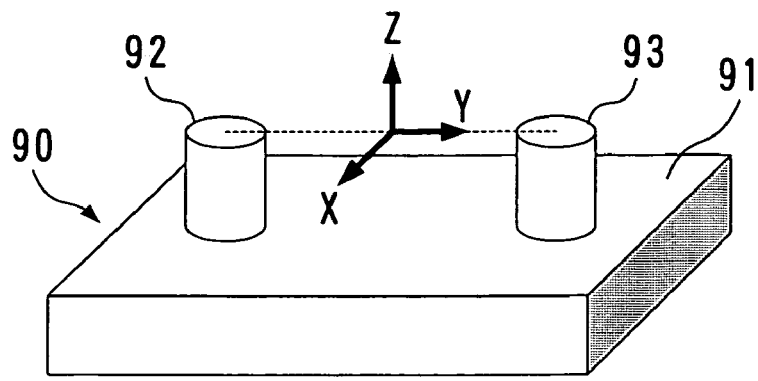
FIG. 2 is a diagram showing an example of an object.

FIG. 2 is a diagram showing an example of an object. In this specification, an object having a relatively simple shape is exemplified for descriptive purposes. However, an actual object may be an object having a complicated shape such as a non-linear (curved) surface. It is necessary, however, that at least a portion to be measured of the object has a size falling within a space where the sensor can move, which is determined in the specifications of the sensor moving mechanism 20.

The illustrated object 90 is made up of a rectangular solid 91 and two columns 92 and 93 that are arranged in a manner to project from the upper surface of the rectangular solid 90. In the object 90, a reference point for estimation of the size and the shape is regarded as the intermediate point between the center of the upper surface (circle) of the column 92 and the center of the upper surface (circle) of the column 93. Further, a line connecting the center of the upper surface of the column 92 and the center of the upper surface of the column 93 is defined as Y-axis. An orthogonal coordinate system where the upper surface of the column 92 is regarded as XY-plane is defined as a reference coordinate system.

Figure 3:
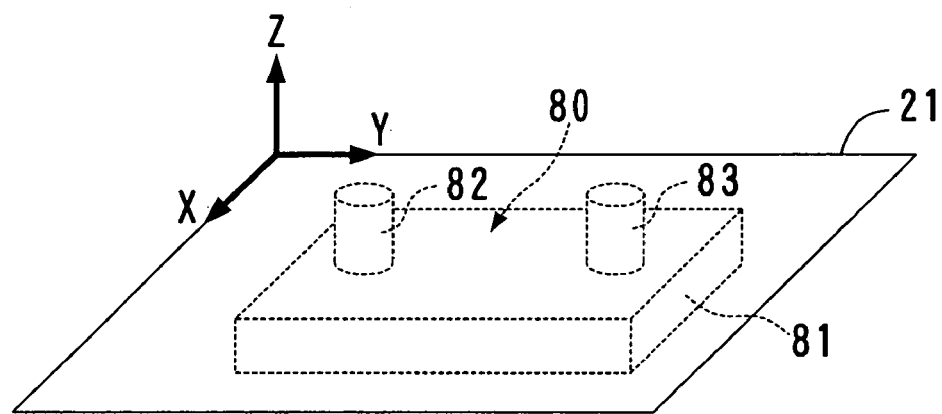
FIG. 3 is a diagram showing arrangement of an imaginary object in off-line teaching.

In off-line teaching for automatic measurement of the object 90, as shown in FIG. 3, an imaginary object 80 is virtually arranged on a reference plane (XY-plane) 21 in a coordinate system (hereinafter referred to as a device coordinate system) of the sensor driving device 1A. Then, positions where the non-contact sensor 10 is operated, postures of the non-contact sensor 10 and order of position change are set. The imaginary object 80 to be arranged is three-dimensional CAD data corresponding to the object 90 and is made up of a rectangular solid 81 and two columns 82 and 83.

Figure 4:
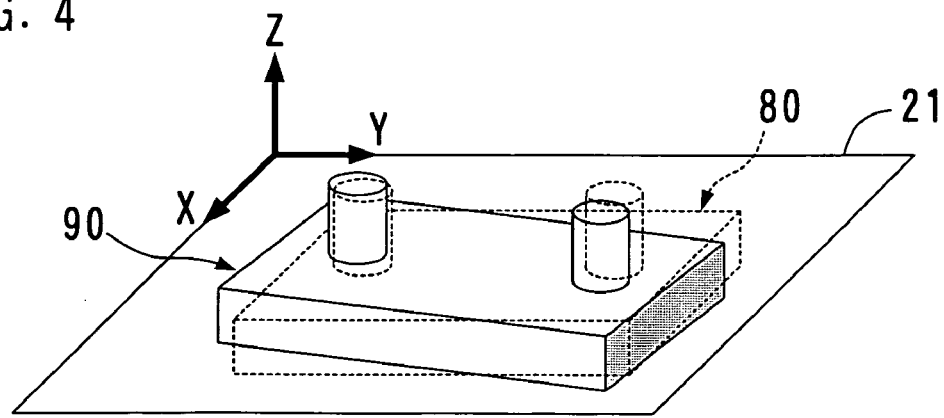
FIG. 4 is a diagram showing an example of an arrangement difference between an imaginary object and an object when measurement is conducted.

In three-dimensional measurement based on a measurement program set by the off-line teaching, as shown in FIG. 4, when the object 90, which is shown by the solid line, differs from the imaginary object 80 (ideal arrangement), which is shown by the broken line, in arrangement, accuracy of measurement data deteriorates or measurement omission occurs. This leads to the possibility that proper measurement results cannot be obtained. In order to avoid such a situation, in the automatic measurement system 1, preliminary measurement is automatically made to modify the measurement path information 51 constituting the measurement program.

The modification of the measurement path information 51 eliminates the problem occurring due to the positioning error of the object 90 and further eliminates the need for arranging the object 90 again. More specifically, in the case where a user arranges the object 90 manually, as long as the amount of the positioning error falls within a tolerance, the user is not requested to arrange the object 90 again. For these reasons, convenience of automatic measurement for the user is not lost.

Hereinafter, descriptions are provided of the modification of the measurement path information 51.

FIG. 5 is a diagram showing a substantial measurement path in off-line teaching. Filled circles in the drawing represent positions where the non-contact sensor 10 is operated (hereinafter referred to as measurement positions), and circles represent passage positions when the non-contact sensor 10 travels.

The measurement path information 51 includes plural pieces of measurement information $Ii=[Li, Pi, Ui]$ each of which is shown by a set of a measurement position $Li=(Lix, Liy, Liz)$, a posture $Pi=(Pix, Piy, Piz)(\|Pi\|=1)$ at a measurement position (a unit vector representing a line-of-sight direction) and a vector $Ui=(Uix, Uiy, Uiz)(\|Ui\|=1)$ representing an upper direction of the non-contact sensor 10. The measurement path information 51 further includes transfer path information $Ji$ from a certain measurement position $Li$ to the next measurement position $Li+1$. The transfer path information $Ji$ is described in the form of a set of points through which the non-contact sensor 10 should pass and is set in such a manner that the non-contact sensor 10 does not interfere with the object 90 (to be exact, the imaginary object 80). Here, the alphabet "i" is the serial number in the movement order.

According to the substantial measurement path illustrated in FIG. 5, measurement is conducted at total eight measurement positions. The starting point of the measurement is the left of the object 90 in the drawing and the measurement position is moved to the front, the right, the rear of the object 90 and above the object 90 in this order. The respective measurement positions correspond to measurement information I1-I8. Referring to FIG. 5, a posture P1 and a vector U1 are shown only for the initial measurement position L1 as a typical example and a posture Pi and a vector Ui are omitted with respect to each of the other measurement positions.

The automatic measurement system 1 performs preliminary measurement in order to determine a modification amount (zero if no error is present) of such measurement path information 51. It is possible to set in advance, in the teaching stage, preliminary measurement path information that is the measurement information Ii and the transfer path information Ji relating to preliminary measurement. In this example, however, the automatic measurement system 1 automatically determines the preliminary measurement path information based on the measurement path information 51 in accordance with the preliminary measurement information 54 shown in FIG. 1.

"Methods for determining the preliminary measurement path information" instructed in the preliminary measurement information 54 include the following three methods.

A first method involves using a part of a measurement path for substantial measurement. For example, measurement information Ii having line-of-sight directions that are closest to the respective directions of X-axis, Y-axis and Z-axis is extracted from the measurement path information 51. FIG. 6 shows a preliminary measurement path when this first method is applied to the example shown in FIG. 5. Referring to the preliminary measurement path shown in FIG. 6, the measurement information I1, I2 and I7 in the example shown in FIG. 5 are used as measurement information I1, I2 and I3 respectively.

A second method involves modifying a measurement path for substantial measurement. More specifically, a measurement path is set that has measurement positions and postures having a line-of-sight direction in each of the directions of X-axis, Y-axis and Z-axis and facing an arrangement position of an imaginary object at a constant distance from the arrangement position of the imaginary object. The constant distance is, for example, the median of a range from the object surface to a distance where the sensor accuracy is guaranteed.

Figure 7:
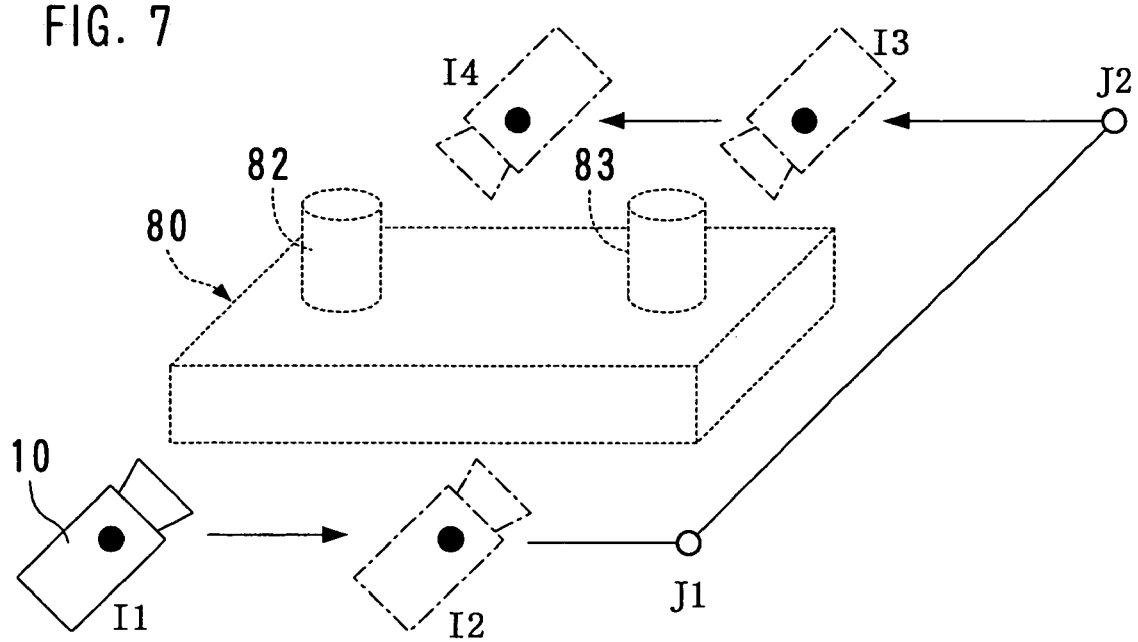
FIG. 7 is a diagram showing an example of a preliminary measurement path with primitives being emphasized.
Figure 8:
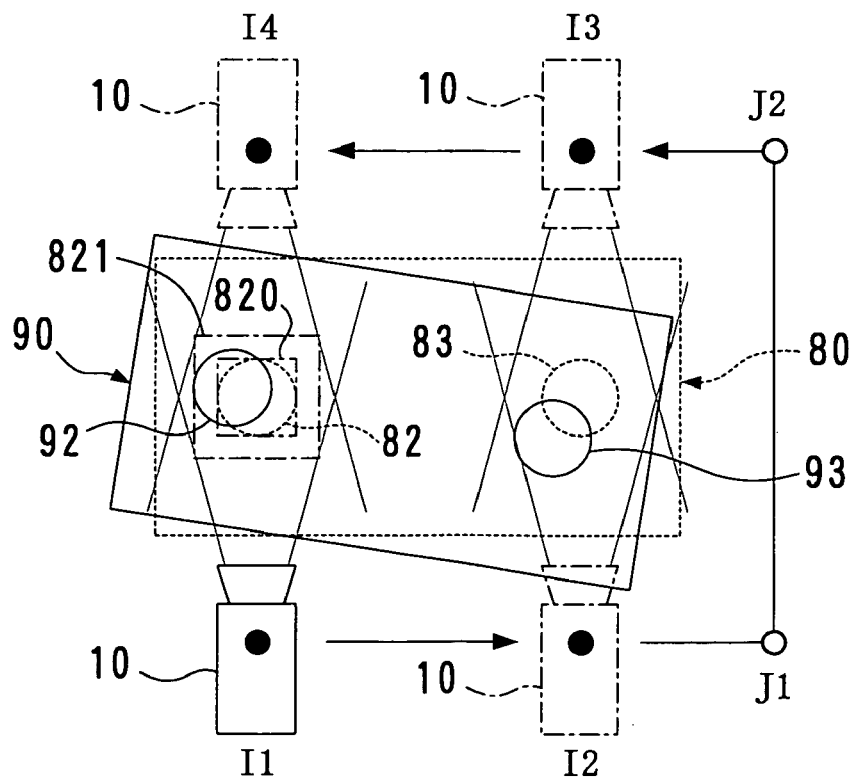
FIG. 8 is a diagram showing a method for setting the preliminary measurement path shown in FIG. 7.

A third method involves, as shown in FIGS. 7 and 8, specifying primitives for defining a reference coordinate system at the time of teaching and calculating measurement positions and postures where these primitives can be measured, on the assumption that the ideal arrangement is achieved. For the calculation, it is desirable to provide a measurement range with a margin in light of the fact that the primitives may not be present at imaginary positions.

In the examples shown in FIGS. 7 and 8, the primitives are the two columns 82 and 83. As illustrated in FIG. 8 showing the state where the object 90 is viewed from above, a measurement target area is set to an area 821 that is provided by enlarging a bounding box (rectangular box of smallest size) 820 for the column 82 as the primitive by a set value, and then measurement positions and postures are calculated.

Preliminary measurement is conducted using preliminary measurement path information determined by any one of the methods described above. If measurement data are not obtained sufficiently in the preliminary measurement, for example, when there is a measurement position where no measurement data are obtained or when the number of points included in a measurement point group is extremely small, the object 90 is determined to be far from being in place. Then, an alarm operation is performed using display, sound or others for the purpose of prompting repositioning of the object 90.

After completing the preliminary measurement, an amount of error is detected between the arrangement of the object 90 at the time of the preliminary measurement and the arrangement of the object 90 at the time of the off-line teaching. Information on the arrangement of the object 90 at the time of the off-line teaching is read with the measurement program.

The amount of error to be detected is an amount of error in the position and the posture of the object 90 and is expressed as coordinate transformation parameters obtained by translation and rotation of the three-dimensional coordinates. More specifically, the detection method is the following: Convergent calculation is performed to determine rotation/translation components of the measurement point group so that the sum of the distances from respective points in the point group determined by the preliminary measurement to the surface of the three-dimensional CAD data (the imaginary object 80) is minimum. In particular, in the case where the third method is used to determine the preliminary measurement path, convergent calculation is performed to determine rotation/translation components so that the measurement point group conforms to a specific primitive, because the correspondence between the measurement point group and the primitive to be measured is known.

The rotation/translation components determined by the convergent calculation are used to calculate coordinate modification parameters of a measurement path. The coordinate modification parameters can be determined by, for example, inverse transformation of coordinate transformation using the coordinate transformation parameters representing the amount of error described above. More specifically, coordinate transformation of a certain coordinate x is expressed as the following equation.

$$x' = Rx + T$$

in which R represents a rotating matrix derived from the rotation components of the coordinate transformation parameters, T represents the translation components and x' denotes the coordinate value after x is subjected to coordinate transformation. Coordinate modification parameters for the coordinate transformation parameters are determined by inverse transformation of the coordinate transformation described above. The coordinate modification parameters are expressed by the following mathematical formula.

$$x = R^{-1}(x' - T) = (R^{-1})x' + (-R^{-1}T) = R'x' + T'$$

where R' indicates a rotating matrix of the coordinate modification parameters and T' denotes translation parameters.

The coordinate modification parameters thus determined are applied to each of the measurement positions/postures within the measurement path, so that the coordinates path is modified. More specifically, modification information L'i, P'i and U'i, which respectively relate to a certain measurement position Li in the measurement path, a posture Pi and a vector Ui showing a sensor upward direction, are expressed as the following equations.

$$L'i = R'Li + T'$$

$$P'i = R'Pi$$

$$U'i = R'Ui$$

Modification similar to that for Li is applied to passage points in the transfer path.

FIG. 9 is a diagram showing a substantial measurement path that is automatically modified. Referring to FIG. 9, modified measurement information I'1-I'8 and modified transfer path information J'1-J'5 correspond to the measurement information I1-I8 and the transfer path information J1-J5 as shown in FIG. 5, respectively. In FIG. 9, with respect to the fourth measurement position as a typical example, a posture of the non-contact sensor 10 before the modification is shown by a dotted line.

If the information modification described above causes the measurement position/posture to be set outside the control of the sensor moving mechanism 20, or, if interference probably occurs between the object 90 and the non-contact sensor 10, another measurement position/posture where a measurement target area of an imaginary object surface can be measured are calculated, so that the coordinate modification parameters are modified again.

For example, when a measurement position is set outside the control of the sensor moving mechanism 20, a measurement position closest to the modified measurement position is calculated within the measurement range. Then, a measurement posture is calculated such that the measurement position thus calculated can be used to calculate a measurement area that was intended to be measured using the modified measurement position/posture. In this way, the measurement position/posture are modified again.

Besides this, even if modified measurement information is set within the control of the sensor moving mechanism 20, the situation possibly arises where the non-contact sensor 10 interferes with the sensor moving mechanism 20 when the modified measurement information is used to control the non-contact sensor 10. In this case also, it is necessary to perform a process for modifying the measurement information again. In such a case, the measurement position information is modified again in a manner to avoid interference with the sensor moving mechanism 20. Then, a measurement posture is determined in which the entire measurement target area before the remodification can be measured at the measurement position thus remodified. In this way, remodified measurement information can be obtained.

In this regard, however, in measurement according to the remodified measurement information, the positional relationship between the non-contact sensor 10 and the object 90 differs from the positional relationship set in the off-line teaching. Accordingly, it is desirable to perform an informing process by beeping, displaying a message, adding alarm information to measurement data or other means, so that a user can be notified of the different positional relationship. The informing process can be performed before or after calculation for remodification. Further, it is possible for the user, who was notified of the necessity of the remodification or notified of the execution of the remodification, to perform an operation for selecting permission or prohibition of measurement in accordance with the remodified measurement information. When the user selects the prohibition, the substantial measurement is stopped. After stopping the substantial measurement, when the user positions the object 90 again and issues a command for measurement start, the automatic measurement system 1 performs preliminary measurement anew.

In the three-dimensional measurement method according to the embodiments described above, a measurement path is set by off-line teaching in which a posture of an object can be assumed arbitrarily, preliminary measurement is performed to automatically modify the measurement path so as to conform to arrangement (position/posture) of the actual object 90. Accordingly, appropriate three-dimensional measurement can be realized for an object for which unique positioning is difficult, e.g., an object having no plane portions, in line with the off-line teaching.

The time required for preliminary measurement is shortened by reducing the number of measurement positions for the preliminary measurement compared to that for substantial examination. Instead, the number of measurement positions for the preliminary measurement may be the same as the number of measurement positions for the substantial measurement.

In the embodiments described above, it is useful to display that preliminary measurement is or will be performed for the sake of user's convenience. It is possible to prepare for a mode in which preliminary measurement is performed and a mode in which no preliminary measurement is performed, thereby to prompt a user to select either one.

The embodiments described above are based on the premise that positioning error of an object is detected, i.e., that arrangement of an object in teaching does not differ markedly from the actual arrangement. In this regard, however, as an application of the present invention, a measurement system is possible in which an object is allowed to be positioned in any posture within a predetermined space, the posture of the object is detected by preliminary measurement and a measurement path is modified in accordance with the posture.

In the embodiments described above, the configuration of the entire or a part of the automatic measurement system 1, the process contents and the like of the measurement controller 40 can be modified in accordance with the spirit of the present invention. For example, hardware can be shared by the NC controller 30 and the measurement controller 40 and sharing of their functions can be realized by programs.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A three-dimensional measurement method for measuring a shape of an object in a non-contact manner, the method comprising:
   using a non-contact sensor for three-dimensional measurement and a sensor moving mechanism that changes a position and a posture of the non-contact sensor and that is adapted to operate by numerical control;
   setting, in advance, measurement path information indicating plural position and postures of the non-contact sensor to store the measurement path information in a memory;
   moving the non-contact sensor in accordance with the stored measurement path information indicating plural positions and postures of the sensor at the respective positions;
   performing, in conjunction with said moving step, preliminary three-dimensional measurement of the object with said non-contact sensor in accordance with a preset procedure automatically determined based on the measurement path information;
   using shape data obtained by the preliminary three-dimensional measurement and shape data of an imaginary object located at an ideal arrangement position as a measurement target at a time of setting the measurement path information in advance to detect a positioning error between the object and the imaginary object, said positioning error being an error between said ideal arrangement position and a position where the object is detected to be positioned;
   modifying the measurement path information depending on the detected positioning error; and
   performing three-dimensional measurement of the object in accordance with the modified measurement path information.

2. The three-dimensional measurement method according to claim 1, wherein the preliminary three-dimensional measurement of the object is performed on a portion of the object.

3. An automatic measurement system for measuring a shape of a three dimensional object in a non-contact manner, the system including a non-contact sensor for three-dimensional measurement, and
   a sensor moving mechanism that changes a position and a posture of the non-contact sensor and is adapted to operate by numerical control,
   wherein the sensor moving mechanism and the non-contact sensor are configured to perform the method comprising:
   setting, in advance, measurement path information indicating plural position and postures of the non-contact sensor to store the measurement path information in a memory;
   moving the non-contact sensor in accordance with the stored measurement path information indicating plural positions and postures of the sensor at the respective positions;
   performing, in conjunction with said moving step, preliminary three-dimensional measurement of the object with said non-contact senor in accordance with a preset procedure automatically determined based on the measurement path information;
   using shape data obtained by the preliminary three-dimensional measurement and shape data of an imaginary object located at an ideal arrangement position as a measurement target at a time of setting the measurement path information in advance to determine an alignment between the object and the imaginary object, said alignment being a difference between said ideal arrangement position and a position where the object is determined to be positioned;
   determining, based on a result of the determined alignment, coordinate transformation parameters used for conforming a position and a posture of the imaginary object located at said ideal arrangement position to a position and a posture of the object;
   calculating, based on the coordinate transformation parameters, coordinate modification parameters for the plural positions and the postures of the sensor at the respective positions, the positions and the posture being indicated in the measurement path information;
   using the coordinate modification parameters determined by the calculation to modify the measurement path information; and
   performing three-dimensional measurement of the object in accordance with the modified measurement path information.

4. The automatic measurement system according to claim 3, wherein the preliminary three-dimensional measurement of the object is performed on a portion of the object.

5. The automatic measurement system according to claim 3, wherein the sensor moving mechanism and the non-contact sensor are further configured to perform the steps of:

memorizing occupied space information indicating spaces occupied by the non-contact sensor and the sensor moving mechanism and movement space information indicating a space where the sensor moving mechanism is movable, before the three-dimensional measurement of the object, determining, based on the occupied space information and the movement space information, whether or not measurement in accordance with the modified measurement path information is possible, when a result of the determination shows that the measurement is impossible, remodifying the modified measurement path information so that the measurement is possible, and performing the three-dimensional measurement of the object in accordance with the remodified measurement path information.

6. A three-dimensional measurement system for measuring a shape of an object in a non-contact manner, the system comprising:

a non-contact sensor for three-dimensional measurement; and a sensor moving mechanism that changes a position and a posture of the non-contact sensor and is adapted to operate by numerical control, wherein said non-contact sensor and said sensor moving mechanism are configured to operate so that:

the non-contact sensor is moved in accordance with measurement path information indicating plural positions and postures of the sensor at the respective positions that is set in advance and stored in a memory, preliminary three-dimensional measurement of the object is performed with said non-contact sensor as said non-contact sensor is moved in accordance with a preset procedure that is determined automatically based on the measurement path information, shape data obtained by the preliminary three-dimensional measurement and shape data of an imaginary object located at an ideal arrangement position as a measurement target at a time of setting the measurement path information in advance are used to detect a positioning error between the object and the imaginary object, said positioning error being an error between said ideal arrangement position and a position where the object is detected to be positioned, the measurement path information is modified depending on the detected positioning error, and three-dimensional measurement of the object is performed in accordance with the modified measurement path information.

7. The three-dimensional measurement system according to claim 6, further comprising a portion for memorizing occupied space information indicating spaces occupied by the non-contact sensor and the sensor moving mechanism and movement space information indicating a space where the sensor moving mechanism is movable, wherein said non-contact sensor and said sensor moving mechanism are further configured to operate so that:

before the three-dimensional measurement of the object, based on the occupied space information and the movement space information, it is determined whether or not measurement in accordance with the modified measurement path information is possible, when a result of the determination shows that the measurement is impossible, the modified measurement path information is remodified so that the measurement is possible, and the three-dimensional measurement of the object is performed in accordance with the remodified measurement path information.

8. The three-dimensional measurement system according to claim 6, further comprising a portion for memorizing occupied space information indicating spaces occupied by the non-contact sensor and the sensor moving mechanism and movement space information indicating a space where the sensor moving mechanism is movable, wherein said non-contact sensor and said sensor moving mechanism are further configured to operate so that:

before the three-dimensional measurement of the object, based on the occupied space information and the movement space information, it is determined whether or not measurement in accordance with the modified measurement path information is possible, and when a result of the determination shows that the measurement is impossible, the three-dimensional measurement of the object is stopped.

9. The three-dimensional measurement system according to claim 7, further comprising a portion for informing that the measurement is impossible, when a result of the determination shows that the measurement is impossible.

* * * * *

UNITED STATES PATENT AND TRADEMARK OFFICE
CERTIFICATE OF CORRECTION

PATENT NO. : 7,724,380 B2 Page 1 of 1
APPLICATION NO. : 11/434310
DATED : May 25, 2010
INVENTOR(S) : Shinichi Horita and Yoshihisa Abe It is certified that error appears in the above-identified patent and that said Letters Patent is hereby corrected as shown below:

Column 10:
Line 34 claim 3, delete "senor" and insert -- sensor --.

Signed and Sealed this

Sixth Day of July, 2010

David J. Kappos
*Director of the United States Patent and Trademark Office*